(12) United States Patent
Sinha et al.

(10) Patent No.: US 12,169,447 B2
(45) Date of Patent: Dec. 17, 2024

(54) TECHNIQUES FOR MANAGING SOFTWARE AGENT HEALTH

(71) Applicant: Okta, Inc., San Francisco, CA (US)

(72) Inventors: Kunal Sinha, Austin, TX (US); Andrey Omelchak, Los Gatos, CA (US)

( * ) Notice: Subject to any disclaimer, the term of this patent is extended or adjusted under 35 U.S.C. 154(b) by 16 days.

(21) Appl. No.: 17/930,187

(22) Filed: Sep. 7, 2022

(65) Prior Publication Data
US 2024/0078164 A1    Mar. 7, 2024

(51) Int. Cl.
| | | |
|---|---|---|
| G06F 15/16 | (2006.01) | |
| G06F 9/48 | (2006.01) | |
| G06F 9/50 | (2006.01) | |
| G06F 9/54 | (2006.01) | |
| G06F 11/34 | (2006.01) | |
| H04L 29/06 | (2006.01) | |

(52) U.S. Cl.
CPC ........ G06F 11/3409 (2013.01); G06F 9/4881 (2013.01); G06F 9/5038 (2013.01)

(58) Field of Classification Search
CPC ... G06F 11/3409; G06F 9/4881; G06F 9/5038
USPC ......................................................... 709/224
See application file for complete search history.

(56) References Cited

U.S. PATENT DOCUMENTS

| | | | | |
|---|---|---|---|---|
| 10,033,609 B1 * | 7/2018 | Tali | ...................... | G06F 11/3419 |
| 11,144,278 B2 * | 10/2021 | Hussain | .............. | H04L 43/0817 |
| 11,537,575 B1 * | 12/2022 | McNair | ............... | G06F 11/3409 |
| 11,641,592 B1 * | 5/2023 | Duraibabu | .............. | G10L 15/22 |
| | | | | 704/270.1 |
| 11,704,219 B1 * | 7/2023 | Lerner | .................. | G06F 11/327 |
| | | | | 714/57 |
| 2006/0217116 A1 * | 9/2006 | Cassett | ............... | H04L 41/5067 |
| | | | | 455/423 |
| 2008/0295095 A1 * | 11/2008 | Watanabe | ........... | G06F 11/0712 |
| | | | | 718/1 |
| 2009/0182866 A1 * | 7/2009 | Watanabe | ........... | G06F 11/3409 |
| | | | | 709/224 |
| 2013/0013953 A1 * | 1/2013 | Eck | ...................... | G06F 11/0712 |
| | | | | 718/1 |
| 2013/0235735 A1 * | 9/2013 | Anantharam | ......... | H04L 49/555 |
| | | | | 370/254 |
| 2014/0310222 A1 * | 10/2014 | Davlos | ................ | G06F 11/2294 |
| | | | | 706/46 |
| 2016/0378629 A1 * | 12/2016 | Gwozdz | ................ | G06F 11/302 |
| | | | | 702/186 |
| 2017/0251019 A1 * | 8/2017 | Mazzitelli | ........... | G06F 11/3452 |
| 2018/0336113 A1 * | 11/2018 | Asawa | ................ | G06F 11/3452 |
| 2020/0348996 A1 * | 11/2020 | Lange | .................. | G06F 11/0751 |
| 2022/0050814 A1 * | 2/2022 | Alt | ............................ | G06N 3/08 |

(Continued)

*Primary Examiner* — Hamza N Algibhah
(74) *Attorney, Agent, or Firm* — Holland & Hart LLP

(57) ABSTRACT

Methods, systems, and devices for managing software agent health are described. A software platform may output multiple requests to one or more software agents. Each request may be associated with operation of a respective software agent. The software platform may obtain statistics for each software agent in response to the multiple requests. The statistics may corresponds to a respective performance of each software agent of the one or more software agents. The software platform may output a recommendation for each software agent, of the one or more software agents, based on the statistics and one or more rules configured at the software platform.

17 Claims, 9 Drawing Sheets

(56) References Cited

U.S. PATENT DOCUMENTS

| | | | |
|---|---|---|---|
| 2022/0286371 A1* | 9/2022 | O'Flaherty | H04L 41/16 |
| 2023/0086541 A1* | 3/2023 | O'Mahony | G06F 11/3006 |
| | | | 714/48 |
| 2023/0105304 A1* | 4/2023 | Mandal | G06F 11/3476 |
| | | | 714/37 |
| 2023/0129856 A1* | 4/2023 | Pietrzak | G06F 8/60 |
| | | | 714/46 |
| 2024/0161906 A1* | 5/2024 | Cho | G16H 10/20 |

* cited by examiner

TECHNIQUES FOR MANAGING SOFTWARE AGENT HEALTH

FIELD OF TECHNOLOGY

The present disclosure relates generally to database systems and data processing, and more specifically to techniques for managing software agent health.

SUMMARY

The described techniques relate to improved methods, systems, devices, and apparatuses that support techniques for managing software agent health. For example, a software platform may output multiple requests to one or more software agents in which each request may be associated with operation of a respective software agent. In response to the multiple requests, the software platform may obtain statistics for each software agent. In some examples, the statistics may corresponds to a respective performance of each software agent. The software platform may output a recommendation for each software agent based on the statistics and one or more rules configured at the software platform.

A method for managing software agents at a device is described. The method may include outputting, at a software platform of the device, a set of multiple requests to one or more software agents, where each request of the set of multiple requests is associated with operation of a respective software agent, obtaining, at the software platform of the device, a set of multiple statistics for each software agent in response to the set of multiple requests, where the set of multiple statistics corresponds to a performance of the respective software agent, and outputting, at the software platform of the device, a recommendation for each software agent based on the set of multiple statistics and one or more rules configured at the software platform of the device.

An apparatus for managing software agents at a device is described. The apparatus may include a processor, memory coupled with the processor, and instructions stored in the memory. The instructions may be executable by the processor to cause the apparatus to output, at a software platform of the device, a set of multiple requests to one or more software agents, where each request of the set of multiple requests is associated with operation of a respective software agent, obtain, at the software platform of the device, a set of multiple statistics for each software agent in response to the set of multiple requests, where the set of multiple statistics corresponds to a performance of the respective software agent, and output, at the software platform of the device, a recommendation for each software agent based on the set of multiple statistics and one or more rules configured at the software platform of the device.

Another apparatus for managing software agents at a device is described. The apparatus may include means for outputting, at a software platform of the device, a set of multiple requests to one or more software agents, where each request of the set of multiple requests is associated with operation of a respective software agent, means for obtaining, at the software platform of the device, a set of multiple statistics for each software agent in response to the set of multiple requests, where the set of multiple statistics corresponds to a performance of the respective software agent, and means for outputting, at the software platform of the device, a recommendation for each software agent based on the set of multiple statistics and one or more rules configured at the software platform of the device.

A non-transitory computer-readable medium storing code for managing software agents at a device is described. The code may include instructions executable by a processor to output, at a software platform of the device, a set of multiple requests to one or more software agents, where each request of the set of multiple requests is associated with operation of a respective software agent, obtain, at the software platform of the device, a set of multiple statistics for each software agent in response to the set of multiple requests, where the set of multiple statistics corresponds to a performance of the respective software agent, and output, at the software platform of the device, a recommendation for each software agent based on the set of multiple statistics and one or more rules configured at the software platform of the device.

In some examples of the method, apparatuses, and non-transitory computer-readable medium described herein, outputting the set of multiple requests may include operations, features, means, or instructions for outputting, to a software agent of the one or more software agents, a first request at a first time instance for first information and a second request for second information at a second time instance subsequent to the first time instance, where the first information and the second information may be associated with the operation of the software agent and obtaining the first information in response to the first request and the second information in response to the second request, where obtaining the set of multiple statistics for the software agent may be based on the first information and the second information.

In some examples of the method, apparatuses, and non-transitory computer-readable medium described herein, the first information includes a first type of information and the second information includes a second type of information different from the first type of information.

In some examples of the method, apparatuses, and non-transitory computer-readable medium described herein, the first information and the second information include one or more performance metrics.

In some examples of the method, apparatuses, and non-transitory computer-readable medium described herein, outputting the set of multiple requests may include operations, features, means, or instructions for outputting, to a software agent of the one or more software agents, a first request for first information associated with the operation of the software agent and a second request for the software agent to perform a task and obtaining the first information in response to the first request and second information associated with execution of the task by the software agent in response to the second request, where obtaining the set of multiple statistics for the software agent may be based on the first information and the second information.

Some examples of the method, apparatuses, and non-transitory computer-readable medium described herein may further include operations, features, means, or instructions for obtaining a first request for information associated with the operation of a software agent of the one or more software agents, outputting a second request for the information to the software agent in response to the first request, and obtaining the information from the software agent in response to the second request, where outputting the recommendation for the software agent may be further based on the information.

Some examples of the method, apparatuses, and non-transitory computer-readable medium described herein may further include operations, features, means, or instructions for generating a set of multiple analytics using the one or more rules and the set of multiple statistics for each software agent, where outputting the recommendation for each software agent may be based on the set of multiple analytics.

In some examples of the method, apparatuses, and non-transitory computer-readable medium described herein, outputting the recommendation for each software agent may include operations, features, means, or instructions for outputting a request to review or modify the operation of the respective software agent.

Some examples of the method, apparatuses, and non-transitory computer-readable medium described herein may further include operations, features, means, or instructions for performing, at the software platform of the device, a training operation using a machine learning model, where the one or more rules may be based on the training operation.

In some examples of the method, apparatuses, and non-transitory computer-readable medium described herein, the one or more rules include conditional expressions.

In some examples of the method, apparatuses, and non-transitory computer-readable medium described herein, the performance of the respective software agent may be associated with the software platform, one or more other software platforms, a server associated with the respective software agent, or any combination thereof.

BACKGROUND

A software application may request a user to log into an account using authentication information, such as a combination of a username and a password. Users who have accounts for several different applications must therefore remember several different usernames and passwords. Additionally, or alternatively, the necessity of separately logging in to each application may impose a considerable burden on a user, who must enter usernames and passwords for each application used. In some cases, a user may use a software platform to help manage contacts or other identifying information associated with accounts for accessing software applications through login requests. In some cases, the software platform may delegate tasks, such as authentication of credentials used as part of a login request, to software agents. However, for some use cases, conventional management techniques for software agents may be deficient or sub-optimal in some current configurations.

DETAILED DESCRIPTION

Figure 1:
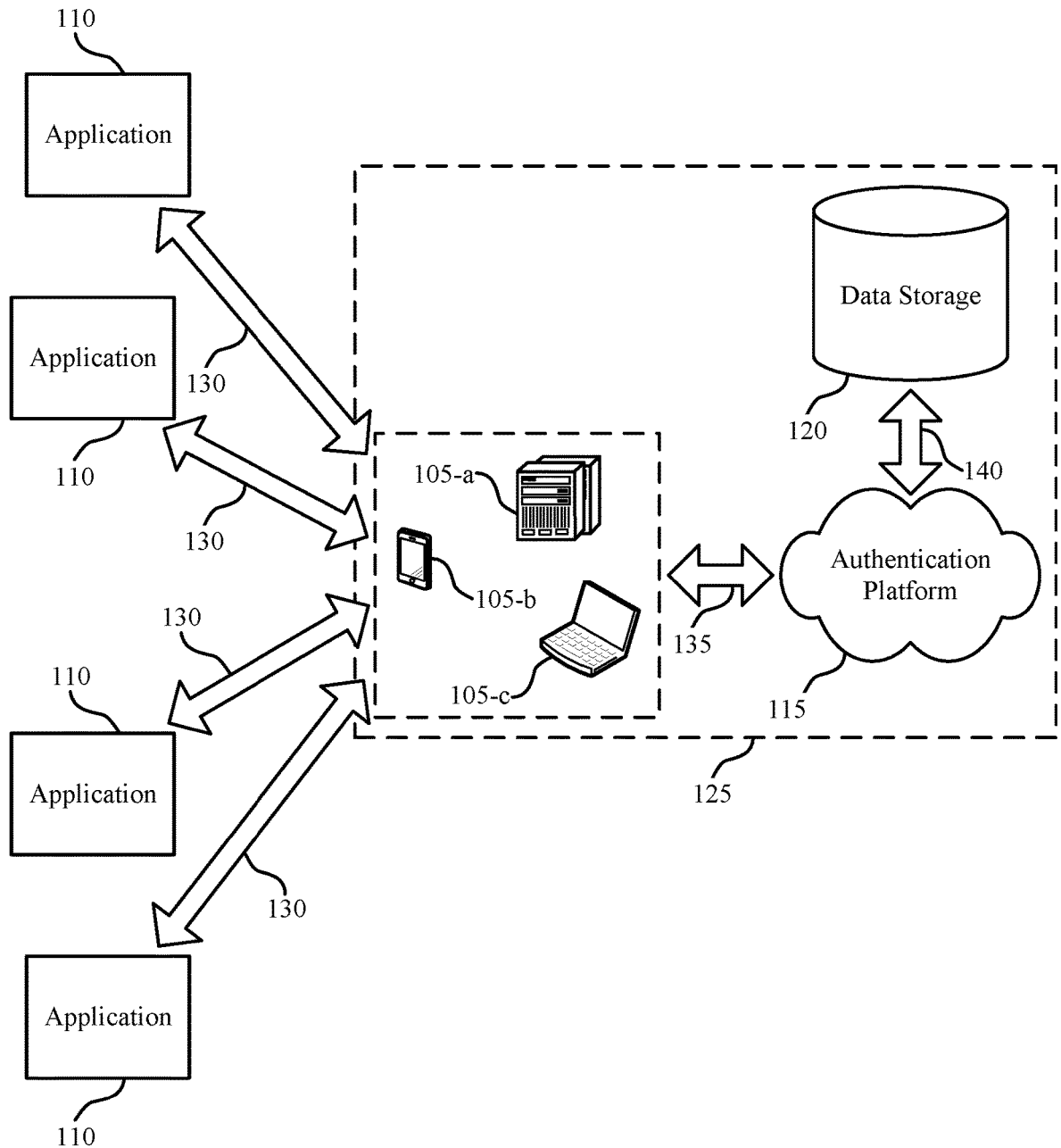
FIG. 1 illustrates an example of a managing software agents system that supports techniques for managing software agent health in accordance with aspects of the present disclosure.

A user may use a software platform (which, for example, may be referred to as a "wallet" or a "password manager") to manage identifying information associated with the user. The identifying information may include personal information (e.g., name, social security number, driver license number), contact information (e.g., home address, telephone number, email address), payment information (e.g., credit card number, bank information), account information (e.g., usernames, passwords), or any combination thereof. Additionally, or alternatively, the user may use the software platform to access resources associated with a request (e.g., a login request, a network protocol request). For example, the user may use the software platform to authenticate and authorize access to resources, such as resources associated with an application, as part of a login request. In some examples, the application may allow the software platform to manage login verification or other authentication procedures for the application (e.g., as part of a customer identity and access management (CIAM) relationship). For example, an organization associated with the application may use the software platform to manage login verification or other authentication procedures for the application.

In some examples, the software platform may delegate tasks, such as authentication of credentials, to one or more software agents. For example, the software platform may delegate the authentication of credentials used as part of the login request (e.g., for access to resources associated with the application) to a software agent. In some examples, the software agent may be stored locally at a device associated with the organization (e.g., one or more client devices that may be on-premises devices). In such examples, an administrator of the application may manage the software agent. For example, the administrator may manage an environment or operation (or both) of the software agent, such as a quantity of tasks or type of tasks, or both, to be performed using the software agent. Additionally, or alternatively, the administrator may manage a quantity of memory available to the software agent, a quantity of processing power available to the software agent, or an operating system to be used by the software agent, or any combination thereof. In some examples, while the administrator may manage the operation or environment (or both) of the software agent, the administrator may be incapable of monitoring a performance of the software agent (or one or more other software agents implemented by the administrator). For example, although the administrator may identify that a login request delegated to a particular software agent failed, the administrator may be incapable of determining a cause of the failure. Additionally, or alternatively, a duration between a time instance at which the failure may occur and another time instance at which the administrator may identify the failure may be relatively long and lead to increased latency for a user (e.g., a user that submitted the login request).

Various aspects of the present disclosure generally relate to techniques for managing software agent health, and more specifically, to a framework for providing recommendations to an administrator of one or more software agents. For example, a software platform may provide one or more recommendations to the administrator based on information (e.g., software-agent-specific information) obtained at the software platform. In some examples, the software platform may obtain the software-agent-specific information by outputting multiple requests to one or more software agents (e.g., managed by the administrator). In such an example, each request may be associated with operation of a respective software agent. For example, a request (e.g., of the multiple requests) output to a software agent may be for information associated with the operation of the software agent. In some examples, the software platform may obtain statistics for each software agent in response to the multiple requests. In such examples, the statistics may corresponds to a respective performance of each software agent. For example, the software platform may output multiple requests to the software agent over a duration to obtain the statistics corresponding to the performance of the software agent. In some examples, the software platform may output a recommendation (or multiple recommendations, such as to the administrator) for each software agent based on the statistics and one or more rules (e.g., a rule engine, such as an analytic rule engine) configured at the software platform. For example, the software platform may use the rule engine to generate the recommendation for each software agent.

Aspects of the subject matter described herein may be implemented to realize one or more of the following potential advantages. For example, the techniques employed by the described software platform may provide benefits and enhancements for managing software agents, including providing increased visibility of software agent performance to administrators of software agents. In some examples, by providing recommendations associated with operation of the software agents to the respective administrators, the software platform may increase administrator visibility into the software agent performance, which may lead to reduce latency and improved user experience, among other possible benefits. Aspects of the disclosure are initially described in the context of a system for distributed computing. Aspects of the disclosure are also described in the context of an architecture, an event diagram, and a process flow. Aspects of the disclosure are further illustrated by and described with reference to apparatus diagrams, system diagrams, and flowcharts that relate to techniques for managing software agent health.

FIG. 1 illustrates an example of a system 100 for distributed computing (e.g., cloud computing) that supports techniques for managing software agent health in accordance with various aspects of the present disclosure. The system 100 includes client devices 105, applications 110, authentication platform 115, and data storage 120. Authentication platform 115 may be an example of a public or private cloud network. A client device 105 may access authentication platform 115 over network connection 135. The network may implement transmission control protocol and internet protocol (TCP/IP), such as the Internet, or may implement other network protocols. A client device 105 may be an example of a user device, such as a server (e.g., client device 105-a), a smartphone (e.g., client device 105-b), or a laptop (e.g., client device 105-c). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other organization type.

A client device 105 may interact with multiple applications 110 via one or more interactions 130. The interactions 130 may include digital communications, application programming interface (API) calls, hypertext transfer protocol (HTTP) messages, or any other interaction between a client device 105 and an application 110. Data may be associated with the interactions 130. A client device 105 may access authentication platform 115 to store, manage, and process the data associated with the interactions 130. In some examples, the client device 105 may have an associated security or permission level. A client device 105 may have access to some applications, data, and database information within authentication platform 115 based on the associated security or permission level, and may not have access to others.

Applications 110 may interact with the client device 105 via email, web, text messages, or any other suitable form of interaction. The interaction 130 may be a business-to-business (B2B) interaction or a business-to-consumer (B2C) interaction. An application 110 may also be referred to as a customer, a client, a website, or some other suitable terminology. In some examples, the application 110 may be an example of a server, a node, a compute cluster, or any other type of computing system, component, or environment. In some examples, the application 110 may be operated by a user or group of users.

Authentication platform 115 may offer cloud-based services to the client devices 105, the applications 110, or both. In some examples, authentication platform 115 may support a database system such as a multi-tenant database system. In such cases, authentication platform 115 may serve multiple client devices 105 with a single instance of software. However, other types of systems may be implemented, including—but not limited to—client-server systems, mobile device systems, and mobile network systems. Authentication platform 115 may receive data associated with interactions 130 from the client device 105 over network connection 135, and may store and analyze the data. In some examples, authentication platform 115 may receive data directly from an interaction 130 between an application 110 and the client device 105. In some examples, the client device 105 may develop applications to run on authentication platform 115. Authentication platform 115 may be implemented using remote servers. In some examples, the remote servers may be examples of data storage 120.

Data storage 120 may include multiple servers. The multiple servers may be used for data storage, management, and processing. Data storage 120 may receive data from authentication platform 115 via connection 140, or directly from the client device 105 or an interaction 130 between an application 110 and the client device 105. Data storage 120 may utilize multiple redundancies for security purposes. In some examples, the data stored at data storage 120 may be backed up by copies of the data at multiple locations.

Subsystem 125 may include client devices 105, authentication platform 115, and data storage 120. In some examples, data processing may occur at any of the components of subsystem 125, or at a combination of these components. In some examples, servers may perform the data processing. The servers may be a client device 105 or located at data storage 120.

In some examples of the system 100, the subsystem 125 (e.g., a software platform) may delegate tasks, such as authentication of credentials, to software agents. The software agents may be located at (e.g., stored at) one or more on-premises devices (e.g., one or more client devices or one or more other servers). For example, the subsystem 125 may output a request (e.g., via an interaction 130) to a software agent (e.g., stored at a client device 105) for the software agent to perform a task on behalf of the subsystem 125. The task may include delegated authentication, for example to verify access to an application 110. In some examples, while the administrator of the software agent may manage the operation or environment (or both) of the software agent, the administrator may be incapable of monitoring (e.g., collecting information associated with) a performance of the software agent. For example, although the administrator may identify that the software agent failed to execute the delegated authentication, the administrator may be incapable of determining a cause of the failure, which may lead to persistent failures and reduced performance.

As described herein, the subsystem 125 (e.g., a software platform associated with a client device 105, or an authentication platform 115, or both) may be configured to provide one or more recommendations to the administrator based on software-agent-specific information obtained at the subsystem 125. For example, the subsystem 125 may obtain the software-agent-specific information by outputting multiple requests (e.g., health actions, health status actions) to one or more software agents managed by the administrator. In such an example, a request (e.g., of the multiple requests) output to a software agent may indicate for the software agent to report (e.g., indicate to the subsystem 125) information associated with the operation of the software agent. In some examples, the subsystem 125 may obtain statistics corresponds to a respective performance of each software agent in response to the multiple requests. For example, the subsystem 125 may output multiple requests to the software agent over a duration to obtain the statistics corresponding to the performance of the software agent. In some examples, the subsystem 125 may output a recommendation (or multiple recommendations, such as to the administrator) for each software agent based on the statistics and one or more rules (e.g., a rule engine, such as an analytic rule engine) configured at the subsystem 125. For example, the subsystem 125 may use the rule engine to generate the recommendation for each software agent. In some examples, by providing recommendations associated with the operation of the software agents to the respective administrators, the subsystem 125 may increase administrator visibility into the software agent performance, which may lead to reduce latency and improved user experience, among other possible benefits.

In some examples, the administrator may trigger the subsystem 125 to request information associated with the performance of a particular software agent. For example, to identify whether an operating system used by a software agent (or multiple software agents) is supported by the subsystem 125, the administrator may output a first request (e.g., via another client device 105) to the subsystem 125 for information associated with the software agent. In response to the first request, the subsystem 125 may output a second request to the software agent. The second request (e.g., a health action) may indicate for the software agent to report information associated with the operating system used by the software agent. In some examples, the subsystem 125 may use the information (e.g., a snapshot of the software agent performance obtained in response to the second request) and one or more rules configured at the subsystem 125 (e.g., a rule engine, such as an analytic engine) to output a recommendation to the administrator (e.g., in response to the first request). For example, based on the information and the one or more rules, the subsystem 125 may output a recommendation for the administrator to update (e.g., patch) the operating system used by the software agent. In some examples, by providing the recommendation for the administrator to update the operating system used by the software agent, the subsystem 125 may increase efficiency of managing on-premises software agents, among other possible benefits.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
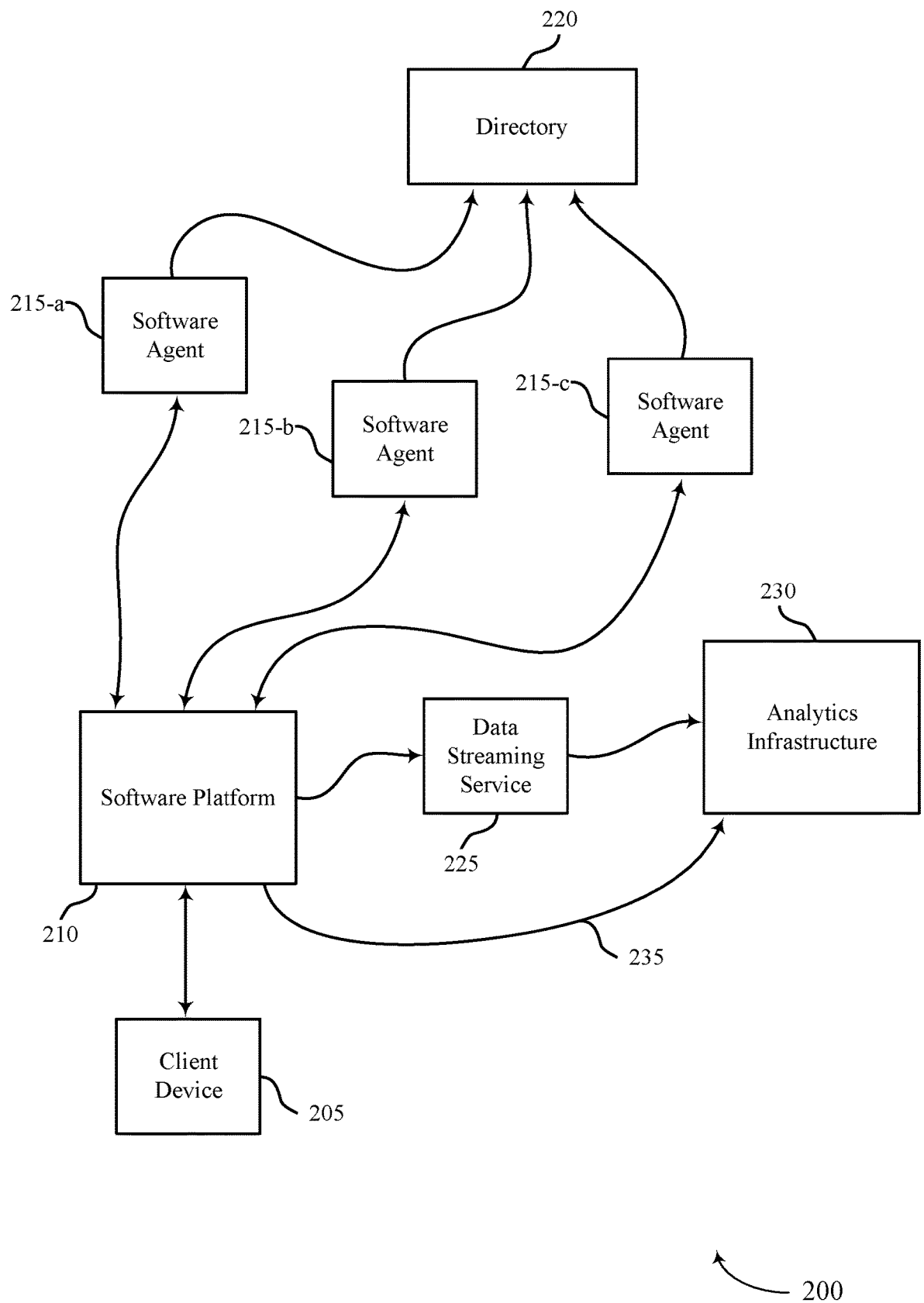
FIG. 2 illustrates an example of an architecture that supports techniques for managing software agent health in accordance with aspects of the present disclosure.

FIG. 2 illustrates an example of an architecture 200 that supports techniques for managing software agent health in accordance with aspects of the present disclosure. In some examples, the architecture 200 may implement or be implemented by aspects of the system 100. For example, the architecture 200 may include a software platform 210, which may be an example of subsystem 125 as described with reference to FIG. 1. Additionally, or alternatively, the architecture 200 may include a client device 205, which may be an example of a client device 205 as described with reference to FIG. 1. The architecture 200 may provide for improved management of software agents 215, among other possible benefits.

In some examples, an organization associated with one or more applications (or services) may use the software platform 210 to manage login verification (or other authentication procedures) for the one or more applications. In some examples, as part of managing login verification, the software platform 210 may delegate tasks, such as authentication of credentials, to one or more software agents (e.g., a software agent 215-a, a software agent 215-b, or a software agent 215-c, or any combination thereof). In some examples, the software agent 215-a, the software agent 215-b, and the software agent 215-c may be stored at on-premises devices (e.g., locally at one or more devices associated with the organization). In such examples, an administrator of the application (e.g., an administrator of the organization) may manage the software agents 215.

For example, the administrator (e.g., via the client device 205) may manage an environment or operation (or both) of the software agents 215. In some examples, as part of managing the software agents 215, the administrator may determine to adjust (e.g., change, alter, vary) one or more parameters associated with the operation or environment of the software agents 215 (e.g., to increase performance). For example, the administrator may determine to adjust a quantity of tasks to be performed using the software agents 215, a type of tasks to be performed using the software agents 215 (e.g., frequent tasks, infrequent tasks, relatively long-running tasks), a quantity of memory available to the software agents 215, a quantity of processing power available to the software agents 215, an operating system to be used by the software agents 215, among other possible parameters associated with the operation or environment (or both) of the software agents 215.

In some examples, the administrator may determine to adjust a parameter (or multiple parameters) of a software agent (e.g., the software agent 215-a, the software agent 215-b, or the software agent 215-c) based on a respective performance of the software agent or a collective performance of multiple software agents (or both). That is, situations may occur in which it may be desirable (e.g., beneficial) for the software platform 210 and the administrator of the organization (e.g., via the client device 205) to determine (e.g., identify) a success rate of tasks delegated to the software agents 215 over a duration (e.g., over a previous duration, such as a past 1-7 days), a type (or quantity) of latency experienced at the software agents 215 (e.g., due an infrastructure associated with the software platform 210 or the on-premises devices in which the software agents may be stored), whether the software agents 215 may be performing an increased quantity of tasks (e.g., whether the software agents 215 are stressed), a quantity (or type) of errors associated with traffic of the software agents 215 (e.g., that may be observed at the software platform 210), whether a quantity of software agents 215 is sufficient (e.g., to perform tasks on behalf of the software platform 210), or whether the software platform 210 may identify any recommendations associated with the software agents 215, among other examples. Additionally, or alternatively, the administrator (e.g., of the organization, a customer) may use such information to perform load balancing and assign weights to the software agents 215 (from a monolith associated with the software platform 210). In some examples, however, the administrator (e.g., via the client device 205) may be incapable of monitoring the performance of the software agents 215. That is, the administrator may be unaware of statistics associated with the performance of the software agents 215 and, as such, may be incapable of adjusting parameters associated with the operation or environment of the software agents 215 (e.g., performing corrective actions) based on the performance of the software agents 215.

In some examples, techniques for managing software agent health, as described herein, may provide one or more enhancements to login verifications, for example by increasing the performance of the software agents 215. For example, the architecture 200 (e.g., and the devices included in the architecture 200, such as the software platform 210, the client device 205, and the software agents 215) may support a framework (e.g., an agent health insights tool) that may enable the software platform 210 to leverage data collected at the software platform 210 and provide (e.g., output) recommendations to the administrator (e.g., via the client device 205). For example, the software platform 210 may analyze collected data and output recommendations to the administrator based on the analysis (e.g., using the agent insights tool).

As illustrated in the example of FIG. 2, the software platform 210 may perform tasks (e.g., delegated authentication, read data, write data, modify a password) using the software agents 215. For example, the software platform 210 may support a framework for data flow associated with tasks in which an instance of a directory (e.g., an event in which a directory 220 or multiple directories including the directory 220 may be accessed, such as by the software agents 215 for delegated authentication) may publish statistics associated with the tasks to the analytics infrastructure 230. For instance, the software platform 210 may output a request (e.g., via a que) to the software agent 215-a for the software agent 215-a to perform a task. As described herein, a task may be referred to as an action. In response, the software agent 215-a may perform the action and output a response to the software platform 210. In some examples, the response may indicate whether the software agent 215-a successfully performed the action (e.g., may indicate a success or a failure), among other types of responses.

In some examples, the software platform 210 may store the response (e.g., via a data streaming service 225) as an event at the analytics infrastructure 230 (e.g., for a duration). In some examples, the software platform 210 may leverage the framework and utilize an API 235 (e.g., an analytics infrastructure API, such as may be invoked via the agent health insights tool) to use events as sources (e.g., for building the agent health insights tool). That is, the software platform 210 may utilize the framework (e.g., including the API 235) to access events stored in the analytics infrastructure 230. In some examples, the software platform 210 may access the events to obtain information (e.g., performance metrics) over a duration, such as to obtain (e.g., build) statistics (e.g., a data set) for each software agent 215. The software platform 210 may use statistics obtained for a software agent 215 to generate analytics (e.g., using one or more rules) and output recommendations for the software agent 215.

In some examples, the software platform 210 may augment events (e.g., events stored at the analytics infrastructure API, such as delegated authentication events) with other information (e.g., additional details). For example, the software platform 210 may enable the software agents 215 to report (e.g., publish) a duration during which the action may have been performed with the action event itself (e.g., with the event that corresponds to the action and is stored at the analytics infrastructure API). That is, the software platform 210 may output a request for information associated with the action that may include a duration during which the action may have been performed. In such an example, the software platform 210 may access (e.g., read) the event information (e.g., event data) via the API 235. In some examples, to obtain the event information the software platform 210 may determine how events (e.g., event information) may be collected into a monolith (e.g., an application that may be associated with a database from which the software platform 210 may access the event information). For example, the monolith may connect to the analytics infrastructure and may use the API 235 (e.g., may output multiple API calls) to obtain events stored at the analytics infrastructure, such as active directory events or lightweight directory access protocol (LDAP) events. In some examples, to obtain event information for a particular software agent 215 (e.g., for an individual software agent), the software platform may filter the events (e.g., may add events) based on a software agent identifier (ID) associated with the particular software agent 215.

Additionally, or alternatively, the software platform 210 may output another request for one or more of the software agents 215 to perform an action (e.g., a dedicated agent action, a health status action) in which the software agents 215 may report (e.g., return) information associated with the operation of the respective software agents. For example, the software platform 210 may use the health status action to obtain information associated with the performance of the software agents 215 (e.g., performance metrics) from the software agents 215 themselves. In some examples, the software platform 210 may output multiple requests associated with the health status action to the software agents over a duration to obtain statistics (e.g., for the data set of for another data set) for each software agent 215. The software platform 210 may use statistics obtained for a software agent 215 via the health status action or the API 235 (or both) to generate the analytics (e.g., using the one or more rules) and output the recommendations for the software agent 215.

As an illustrative example, the software platform 210 may output the health status action to the software agent 215-a, which may indicate for the software agent 215-a to report an available memory (e.g., a quantity of memory available to the software agent 215-a), a quantity of process CPU utilization (e.g., associated with the software agent 215-a), a quantity of system CPU utilization (e.g., associated with the software agent 215-a), information associated with an operating system used by the software agent 215-a (e.g., operating system details), a quantity of processors (e.g., used by the software agent 215-a), or a quantity of free space (e.g., available to the software agent 215-a), or any combination thereof. In some examples, outputting the health status action to the software agent 215-a may utilize (e.g., impact) the monolith and the software agent 215-a (e.g., the software agent that the health status action is output to). Additionally, or alternatively, the software platform 210 may implement the health status action (e.g., that may be indicated using a command, such as AgentHealthAction) using a directory agent, such as the directory 220. The directory 220 may be an example of an LDAP agent (e.g., proxy) or an active directory agent (e.g., an active directory domain component), among other possible examples. In some examples, an active directory agent may output analytics by altering the LDAP agent, such as to include the health status action. Additionally, or alternatively, a simulator may be used.

In some examples, the software platform 210 may use information obtained via the health status action or the API 235 (e.g., the information stored at the analytics infrastructure 230), or both, to output recommendations to the administrator (e.g., via the client device 205). For example, the software platform 210 may use the one or more rules to determine one or more recommendations based on the obtained information (e.g., a data set). In some examples, the one or more rules may occur (e.g., be stored, operate) separately from code associated with the health insights tool, such as at a database, a configuration file, a machine learning engine, or as extensible code. For example, the one or more rules may be determined by the administrator and implemented by the software platform 210. In some examples, the administrator (e.g., a customer) may determine (e.g., write) one or more rules to generate alerts associated with the software agents 215 (e.g., using the software platform 210). Additionally, or alternatively, the one or more rules may be determined (e.g., or altered) using a machine learning model. For example, the software platform 210 may use the analytics obtained for one or more software agents 215 to perform a training operation using a machine learning model. In such an example, the one or more rules may be based on the training operation.

In some examples of outputting a recommendation, the software platform 210 (e.g., using the one or more rules) may determine whether one or more parameters associated with the operation or environment of the software agents 215 may be altered (e.g., whether to output any flags or warnings to the administrator), for example based on a list of software agents 215 (e.g., including the software agent 215-a, the software agent 215-b, and the software agent 215-c) and a quantity (e.g., percent) of successes and failures associated with the software agents 215 included in the list. Additionally, or alternatively, the software platform may output one or more recommendations based on the list of software agents 215 and a distribution of error-codes associated with the software agents 215 (or respective software agents 215). An error-code may include a delegated authentication timeout or a password expiration (e.g., a password that is associated with the delegated authentication, such as a password of a user attempting to login to an application), among other possible examples. For example, the software platform 210 may determine (e.g., using the one or more rules and based on the list of software agents 215 and the distribution of error codes) that delegated authentication (e.g., or one or more other actions) performed using a particular software agent 215 (e.g., included in the list of software agents 215) may be associated with an increased quantity of expired password error-codes (e.g., relative to other software agents 215 included in the list). In such an example, the software platform 210 may recommend for the administrator to update one or more servers (e.g., directories) associated with the particular software agent 215, among other possible recommendations.

In some examples, the software platform may output a recommendation based on a particular software agent ID, a list of error-codes (e.g., delegated authentication timeouts), and a duration during which a software agent associated with the particular software agent ID may operate on-premises (e.g., on-premises timings). Additionally, or alternatively, the software platform 210 may output one or more recommendations based on a result (e.g., response) from the health status action. That is, the software platform 210 may output recommendations to the administrator based on one or more rules, one or more types of information obtained from the health status action, one or more types of information obtained from the API 235, or any combination thereof. In some examples, the software platform 210 may determine the one or more rules using a machine learning model (e.g., artificial intelligence) and the obtained information (e.g., received data from the health status action or the API 235, or both). That is, using artificial intelligence and the received data, the software platform 210 may generate a set of recommendations. In some examples, the one or more rules may be determined by the administrator (e.g., one or more rules based on a customer, one or more customer-supplied rule) and communicated to the software platform 210. In such examples, the one or more customer-supplied rules may be based on data collected at the client device 205, the software platform 210, or both. The software platform 210 may use the one or more customer-supplied rule (e.g., stored in a database associated with the software platform 210) to generate the set of recommendations. Additionally, or alternatively, in some examples, the software platform 210 may use the one or more customer-supplied rule with the data collected at the client device 205, the software platform 210, or both.

In some examples, the one or more rules may be implemented using a rule engine (e.g., an analytical engine). The rule engine may be an example of a JavaScript-based rule engine or another rule engine that may be realized using one or more other programming languages (e.g., that may utilize a databased pre-written code, such as a library). As an illustrative example, the one or more rules may be represented using one or more hypertext markup language (HTML) elements (e.g., <dependencies>, <dependency>, <groupId>org.jeasy</groupId>, <artifactId>easy-rules-core</artifactId>, </dependency>, </dependencies>). In such an example, the software platform may use code to generate the one or more recommendations. In some examples, the code may be represented in accordance with the following Table 1:

TABLE 1

| 1 | // Build the agent metrics from syslog. |
| 2 | AgentMetrics agentMetrics = new AgentMetrics( ); |
| 3 | agentMetrics.setAgentId("123"); |
| 4 | agentMetrics.setOnPremDelAuthTime(1230); |
| 5 | agentMetrics.setOnPremDelAuthTime(1000); |
| 6 | agentMetrics.setProcessCPULoad(0.7f); |
| 7 | |

TABLE 1-continued

```
 8
 9      // define facts
10      Facts facts = new Facts( );
11      List<String> recommendations = new LinkedList<>( );
12
13      facts.put("agent", agentMetrics);
14      facts.put("recommendations", recommendations);
15
16      Rule recommendationRule = new RuleBuilder( ).
17          name("cpu Percent").
18          when(isHighCPU( )).
19          then(highCPUAction( )).
20          when(isOnPrem SetupSlower( )).
21          then(resolveBottleneck( )).
22          build( );
23
24      ...
25      rulesEngine.fire(rules, facts);
```

In some examples, the code represented in accordance with Table 1 may generate one or more outputs (e.g., recommendations, analytics) that may be ordered (e.g., sorted) according to a type of event (e.g., result of an action), such as a success (e.g., represented as "SUCCESS"), a time-out (e.g., represented as "DEL_AUTH_TIMEOUT"), an invalid credential (e.g., represented as "INVALID_CREDENTIALS"), a locked-out (e.g., represented as "LOCKED_OUT"), an unspecified event (e.g., represented as "NOT_SPECIFIED"), a password expiration (e.g., represented as "PASSWORD_EXPIRED"), or another user account error, such as user account expiration (e.g., represented as "USER_ACCOUNT_EXPIRED"). It is to be understood that the names of elements and the code described herein may change based on implementation of one or more devices (e.g., the software platform 210, the software agents 215, the client device 205, or any combination thereof), and the examples described herein should not be considered limiting to the scope covered by the claims or the disclosure. In some examples, by using the rule engine (e.g., an analytical engine) to output recommendations to the administrator, the software platform 210 may enable increased performance of the software agents 215, among other possible benefits.

Figure 3:
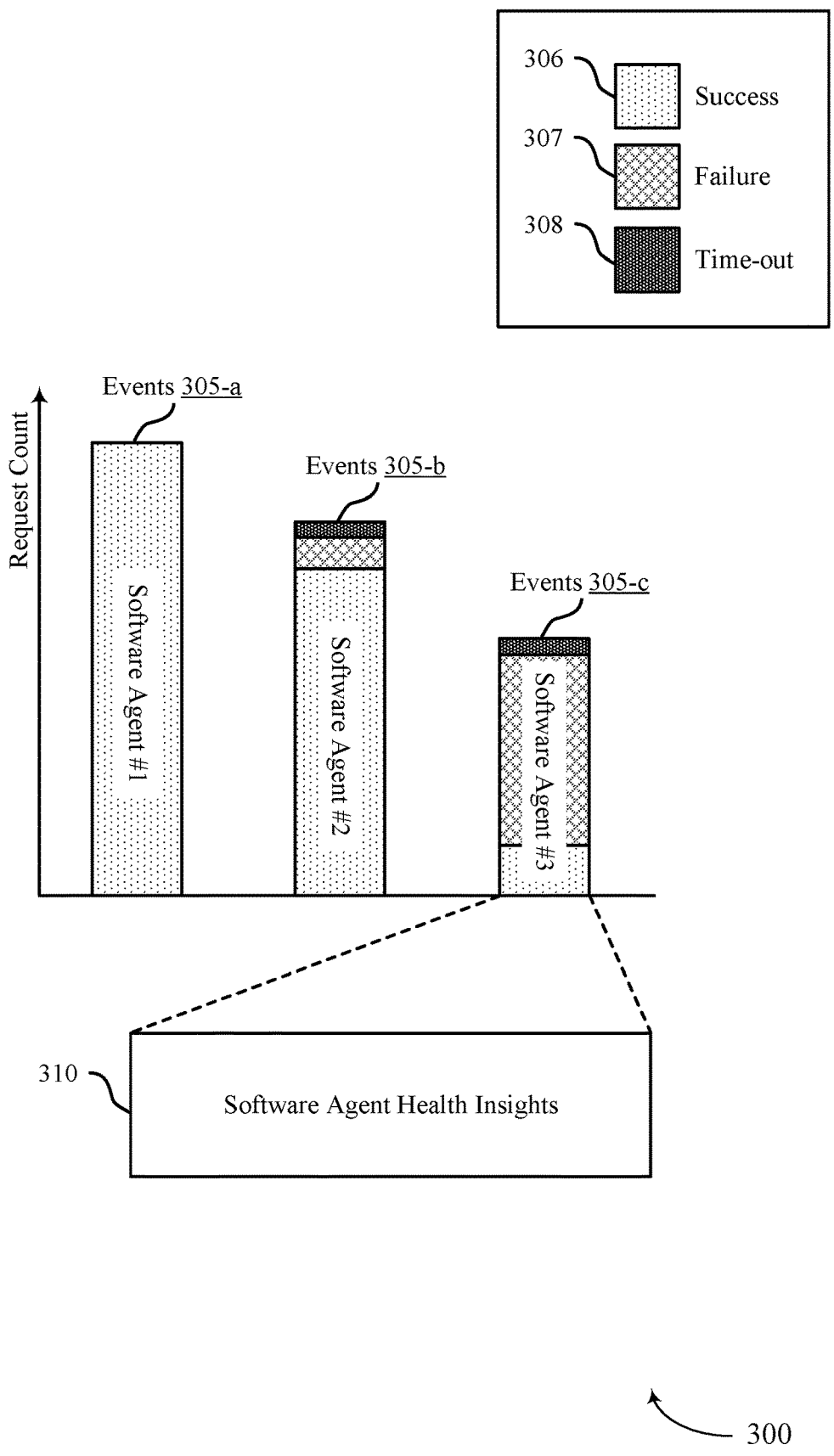
FIG. 3 illustrates an example of an event diagram that supports techniques for managing software agent health in accordance with aspects of the present disclosure.

FIG. 3 illustrates an example of an event diagram 300 that supports techniques for managing software agent health in accordance with aspects of the present disclosure. In some examples, the event diagram 300 may implement or be implemented by aspects of the system 100 and the architecture 200. For example, the event diagram 300 may be implemented at a software platform or a client device, or both, which may be an example of the corresponding devices as described with reference to FIGS. 1 and 2. The event diagram 300 may provide for improved management of software agents, among other possible benefits.

In some examples, the software platform may output recommendations to an administrator of an organization (e.g., an administrator that may manage one or more software agents) via a user interface. In some instances, obtaining the recommendations output by the software platform may include navigation by the administrator (e.g., via the client device). That is, the user interface may include information (e.g., analytics and recommendations) associated with the performance of one or more software agents managed by the administrator. As illustrated in the example of FIG. 3, the user interface may provide information regarding events 305-a, events 305-b, and events 305-c, which may each be associated with a respective software agent. For example, the events 305-a may be associated with (e.g., correspond to actions performed by) software agent #1, the events 305-b may be associated with software agent #2, and the events 305-c may be associated with software agent #3. In some examples, by providing information associated with events 305 of software agents (e.g., individual software agents) to the administrator, the software platform may increase administrator visibility (e.g., provide an overview) of a performance of the software agents (e.g., over a duration, such as a previous 1-7 days). That is, the events 305-a, the events 305-b, and the events 305-c may provide information regarding the performance of the respective software agent across a duration (e.g., a day or another suitable duration).

In some examples, the events 305 may indicate (e.g., capture) a quantity of actions (e.g., a quantity of requests to perform one or more actions) successfully performed by the software agent. That is, the events 305 may indicate a quantity of requests in which information output from the software agent (e.g., in response to the request) indicated a success 306. Additionally, or alternatively, the events 305 may indicate a quantity of actions that failed to be performed by the software agent. That is, the events 305 may indicate a quantity of requests in which information output from the software agent (e.g., in response to the request) indicated a failure 307. In some examples, the events 305 may indicate a quantity of actions performed by the software agent that lead to a time-out. That is, the events 305 may indicate a quantity of requests in which information output from the software agent (e.g., in response to the request) indicated a time-out 308. For example, the events 305 may provide a distribution of time-outs (e.g., delegated authentication time-outs that may have occurred over a duration) across software agents managed by the administrator. Although the example of FIG. 3 illustrates some event types (e.g., success 306, failures 307, and time-outs 308), it is to be understood that other event types may also be indicated, such as invalid credentials, locked-outs, unspecified events, password expiration, user account errors, among other types of events, and the examples described herein should not be considered limiting to the scope covered by the claims or the disclosure.

The software platform may, additionally, or alternatively, output recommendations (e.g., and associated information, such as performance metrics and analytics used to generate the recommendations) for the software agents (e.g., the software agent #1, the software agent #2, and the software agent #3). For example, to determine a cause or corrective action (or both) associated with the failures 307 experienced by the software agent #3, the administrator may select (e.g., using the user interface) the software agent #3 (e.g., associated with the events 305-c) to obtain (e.g., view, probe) one or more recommendations provided by the software platform for the software agent #3. That is, based on the events 305-c, the administrator may select the software agent #3 to begin (e.g., start) performing some diagnostics (e.g., to invoke the rule engine) for the software agent #3. For example, in response to the administrator selecting the software agent #3, the software platform may provide software agent health insights 310 (e.g., one or more recommendations, analytics used to generate the one or more recommendations, and metrics used to generate the analytics) for the software agent #3. In some examples, the one or more recommendations (e.g., diagnostic options) may include a workflow for the administrator (e.g., corrective actions). For example, the administrator may determine (e.g., through navigating within the user interface) that one or more parameters associated with the operation of the software agent #3 may be adjusted and, as such, may select the software agent #3 to obtain analytics and recommendations provided by the software platform for the software agent #3. As an illustrative example, the administrator may probe whether delegated authentication processing may be disproportionately performed by (e.g., skewed towards) the software agent #3 (e.g., relative to the software agent #1 and the software agent #2), whether a quantity (e.g., percentage) of successes 306 experienced by the software agent #3 satisfies a threshold (e.g., fails to exceed a threshold, is less than about seventy percent), or whether the software agent #3 may experience delegated authentication time-outs.

In some examples, subsequent to the one or more rules being invoked (e.g., processed), such as in response to the administrator selecting a software agent, the software platform may output information associated with the software agent (e.g., including the one or more recommendations). In some examples, the software platform may output a software agent ID of the software agent, a quantity (e.g., count) of request (e.g., delegated authentication requests), a quantity of events (e.g., including success 306, failures 307, time-outs 308, and other suitable events), a duration during which the software agent performed an action (or multiple actions), a duration during which the software agent performed operations (e.g., associated with the action) on-premises (e.g., at one or more devices associated with the organization), or a difference between a duration during which the software agent performed an action and a threshold duration for performing the action, or any combination thereof. That is, the software platform may output one or more recommendations that may be associated with a particular software agent ID (e.g., corresponding to a software agent selected by the administrator, such as using drop down menu or a landing graph that illustrates the events 305 for the software agents). In some examples, the software platform may refrain from outputting recommendations. In such examples, the software platform may output an indication that a performance of the respective software agent is suitable. In some examples, the recommendations may be obtained by the administrator via a hyperlink.

In some examples, recommendations for a software agent may be triggered by the administrator. For example, the administrator may output a first request for the software platform obtain (e.g., fetch) particular information (e.g., updated system information) from a particular software agent. In such examples (e.g., in response to receiving the first request for information from the administrator), the software platform may output a second request (e.g., a health status action) to the software agent. In response to outputting the second request, the software agent may obtain a response from the software agent including the information (e.g., the information requested by the administrator). In some examples, the software platform may use the response (e.g., the action) to output the recommendations (e.g., a list of recommendations) for the software agent. For example, the software platform may use the response, statistics associated with the software agent (e.g., that may be obtained over a duration via the health status action or via an API as described with reference to FIG. 2), and the one or more rules (e.g., the rule engine) to output the list of recommendations. In some examples, the list of recommendations may be based on analytics determined at the software platform. For example, the software platform may provide a particular recommendation based on determining that the software agent is experiencing increased (e.g., relatively high) latency due to the time-outs 308 (e.g., delegated authentication time-outs) or that a duration during which the software agent performs an action (e.g., delegated authentication) satisfies a threshold (e.g., is increased relative to a threshold duration for performing the action).

In some examples, the software platform may determine that a software agent is experiencing an increased (e.g., relatively high) latency at the on-prem infrastructure and, in response, may recommend that the administrator review events (e.g., logs) and perform one or more tests to identify a directory being used by the software agent or determine whether a rate at which a directory server (e.g., used by the software agent) is operating satisfies a threshold. Additionally, or alternatively, the software platform may output particular recommendations based on determining whether a quantity of memory available to the software agent is suitable, whether a quantity of CPU usage is suitable, whether an operating system used by the software agent is supported at the software platform, weather a quantity of available disk space is suitable, or weather virtual memory (e.g., swap space) is available, among other examples. In some examples, outputting recommendations to the administrator may provide for increased administrator visibility, among other possible benefits.

Figure 4:
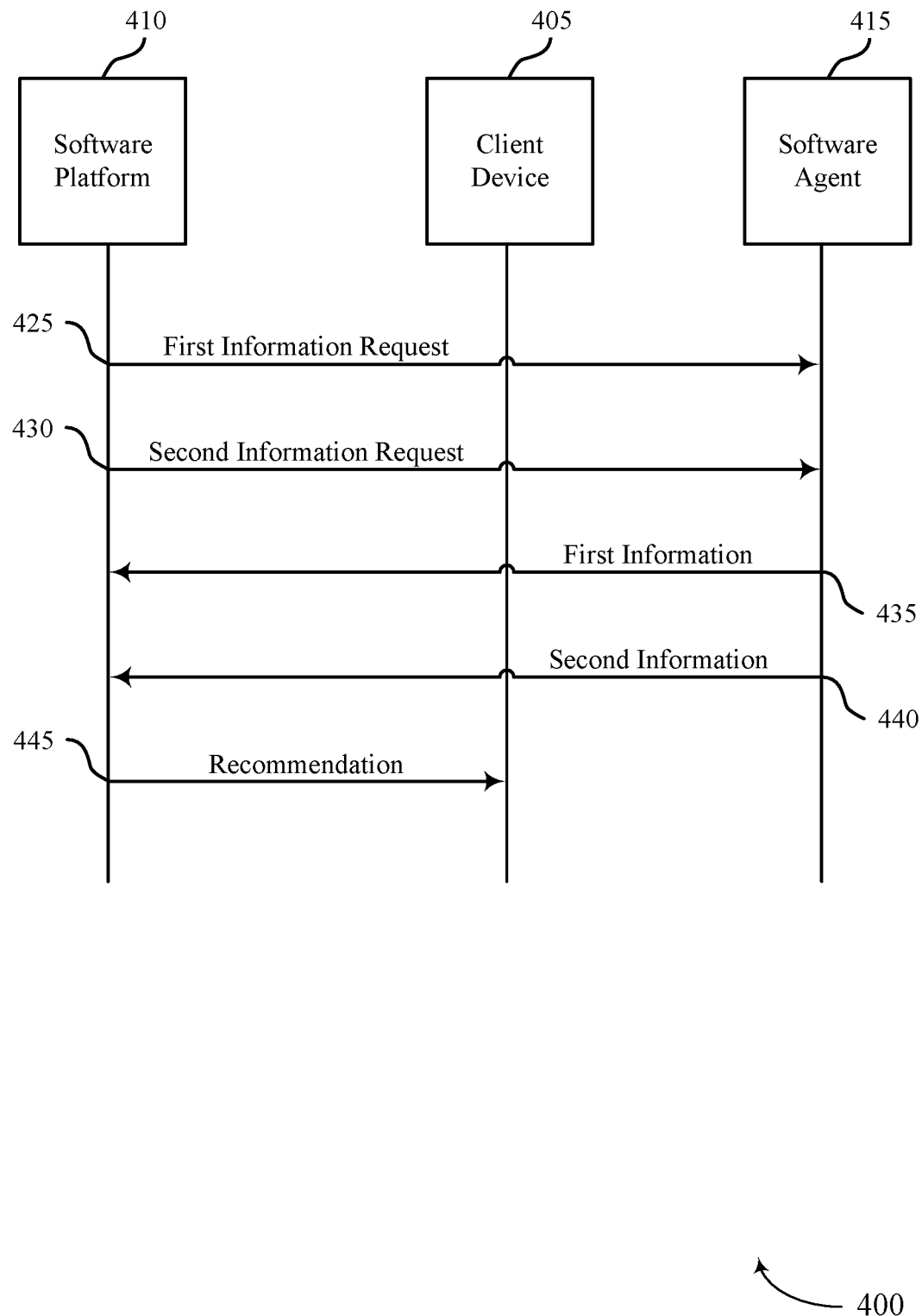
FIG. 4 illustrates an example of a process flow that supports techniques for managing software agent health in accordance with aspects of the present disclosure.

FIG. 4 illustrates an example of a process flow 400 that supports techniques for managing software agent health in accordance with aspects of the present disclosure. In some examples, the process flow 400 may implement or be implemented by aspects of the system 100, the architecture 200, and the event diagram 300. For example, the process flow 400 may be implemented at a client device 405, a software platform 410, a software agent 415, or any combination thereof, which may be an example of the corresponding devices as described with reference to FIGS. 1 through 3. The process flow 400 may provide for improved management of the software agent 415, among other possible benefits. In the following description of the process flow 400, the information communicated between the client device 405, the software platform 410, and the software agent 415 may be performed in different orders or at different times than shown. Additionally, or alternatively, some operations may be omitted from the process flow 400 and other operations may be added to the process flow 400.

In some examples, the software platform 410 may leverage a framework (e.g., an action-framework) for software agents and an analytics infrastructure to output recommendations to an administrator that may manage one or more software agents (e.g., the software agent 415). As illustrated in the example of FIG. 4, the software platform 410 may output a request (e.g., a health status action) to the software agent 415 to obtain information (e.g., data, such as CPU data, memory data, and throughput data) and provide analytics (e.g., and recommendations) for the software agent 415. In some examples, the software platform 410 may output the request to the software agent 415 according to a schedule, such as periodically (e.g., once per hour) or aperiodically. Additionally, or alternatively, the software platform 410 may output the request to the software agent 415 based on a trigger (e.g., in response to being dynamically triggered, such as by the administrator via the client device 405). For example, the software platform 410 may output multiple requests to one or more software agents (e.g., including the software agent 415) and each request may be associated with operation of a respective software agent.

At 425, the software platform 410 may output, to the software agent 415, a first information request at a first time instance, and at 430, the software platform 410 may output a second information request at a second time instance subsequent to the first time instance. In some examples, the first information request and the second information request may include the health status action or one or more other actions associated with the operation of the software agent 415. That is, the first information request may be for first information associated with the operation of the software agent 415 and the second information request may be for second information associated with the operation of the software agent 415. For example, the first information and the second information may include one or more performance metrics (e.g., performance metrics to be reported by the software agent 415 as part of the health status action or one or more other actions). Additionally, or alternatively, the first information may correspond to a different type of information from the second information. That is, in some examples, the software platform 410 may use the health status action to obtain different types of information at different time instances.

At 435, the software platform 410 may obtain the first information in response to the first request and, at 440, the software platform 410 may obtain the second information in response to the second request. In some examples, the software platform 410 may obtain statistics for the software agent 415 based on the first information and the second information. For example, in response to the first information request and the second information request, the software platform 410 may obtain statistics corresponding to a performance of the software agent 415. The statistics may be examples of statistics as described throughout the present disclosure, including with reference to FIGS. 1 through 3. For example, the software platform 410 may use to the statistics (e.g., and the one or more rules) to generate analytics for the software agent 415.

At 445, the software platform 410 may output a recommendation to the administrator (e.g., via the client device 405) for the software agent 415 based on the statistics and the one or more rules configured at the software platform 410. The recommendation may be an example of a recommendation as described throughout the present disclosure, including with reference to FIGS. 1 through 3. For example, the recommendation may include a request for the administrator to review or modify (or both) the operation of the software agent 415 (e.g., one or more parameters associated with the operation of the software agent 415). In some examples, outputting the recommendation to the administrator (e.g., at 445) may aid the software platform 410 in distributing a load (e.g., a quantity of actions to be delegated to multiple software agents including the software agent 415) by outputting actions to software agents that may receive a reduced quantity of actions (e.g., software agents that may have reduced stress, software agents that may poll for tasks at an increased rate).

Figure 5:
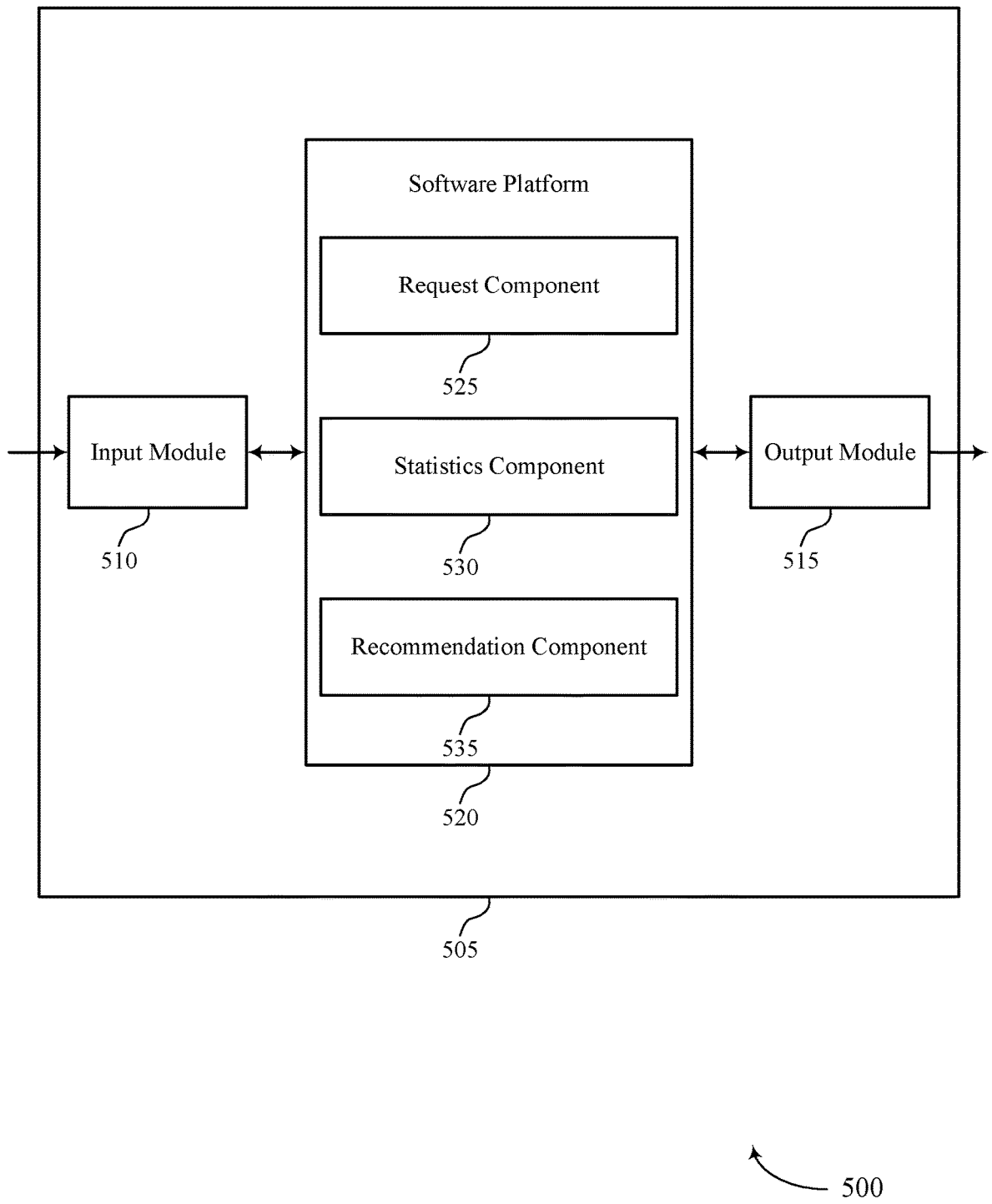
FIG. 5 shows a block diagram of an apparatus that supports techniques for managing software agent health in accordance with aspects of the present disclosure.

FIG. 5 shows a block diagram 500 of a device 505 that supports techniques for managing software agent health in accordance with aspects of the present disclosure. The device 505 may include an input module 510, an output module 515, and a software platform 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the software platform 520 to support techniques for managing software agent health. In some cases, the input module 510 may be a component of an I/O controller 710 as described with reference to FIG. 7.

The output module 515 may manage output signals for the device 505. For example, the output module 515 may receive signals from other components of the device 505, such as the software platform 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the software platform 520 may include a request component 525, a statistics component 530, a recommendation component 535, or any combination thereof. In some examples, the software platform 520, or various components thereof, may be configured to perform various operations (e.g., receiving, monitoring, transmitting) using or otherwise in cooperation with the input module 510, the output module 515, or both. For example, the software platform 520 may receive information from the input module 510, send information to the output module 515, or be integrated in combination with the input module 510, the output module 515, or both to receive information, transmit information, or perform various other operations as described herein.

The software platform 520 may support managing software agents at a device (e.g., the device 505) in accordance with examples as disclosed herein. The request component 525 may be configured as or otherwise support a means for outputting, at a software platform of the device, a set of multiple requests to one or more software agents, where each request of the set of multiple requests is associated with operation of a respective software agent. The statistics component 530 may be configured as or otherwise support a means for obtaining, at the software platform of the device, a set of multiple statistics for each software agent in response to the set of multiple requests, where the set of multiple statistics corresponds to a performance of the respective software agent. The recommendation component 535 may be configured as or otherwise support a means for outputting, at the software platform of the device, a recommendation for each software agent based on the set of multiple statistics and one or more rules configured at the software platform of the device.

Figure 6:
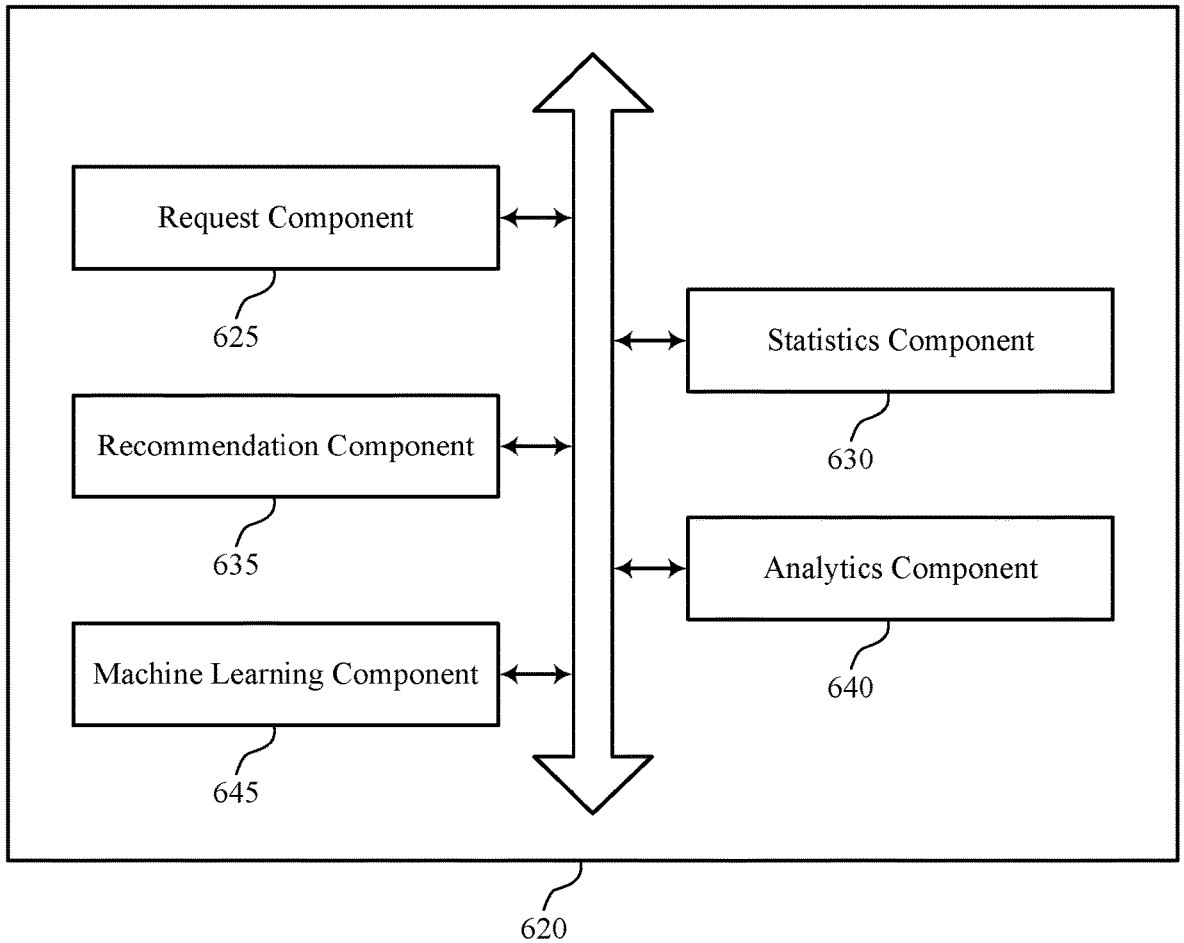
FIG. 6 shows a block diagram of a software platform that supports techniques for managing software agent health in accordance with aspects of the present disclosure.

FIG. 6 shows a block diagram 600 of a software platform 620 that supports techniques for managing software agent health in accordance with aspects of the present disclosure. The software platform 620 may be an example of aspects of a software platform or a software platform 520, or both, as described herein. The software platform 620, or various components thereof, may be an example of means for performing various aspects of techniques for managing software agent health as described herein. For example, the software platform 620 may include a request component 625, a statistics component 630, a recommendation component 635, an analytics component 640, a machine learning component 645, or any combination thereof. Each of these components may communicate, directly or indirectly, with one another (e.g., via one or more buses).

The software platform 620 may support managing software agents at a device in accordance with examples as disclosed herein. The request component 625 may be configured as or otherwise support a means for outputting, at a software platform of the device, a set of multiple requests to one or more software agents, where each request of the set of multiple requests is associated with operation of a respective software agent. The statistics component 630 may be configured as or otherwise support a means for obtaining, at the software platform of the device, a set of multiple statistics for each software agent in response to the set of multiple requests, where the set of multiple statistics corresponds to a performance of the respective software agent. The recommendation component 635 may be configured as or otherwise support a means for outputting, at the software platform of the device, a recommendation for each software agent based on the set of multiple statistics and one or more rules configured at the software platform of the device.

In some examples, to support outputting the set of multiple requests, the request component 625 may be configured as or otherwise support a means for outputting, to a software agent of the one or more software agents, a first request at a first time instance for first information and a second request for second information at a second time instance subsequent to the first time instance, where the first information and the second information are associated with the operation of the software agent. In some examples, to support outputting the set of multiple requests, the statistics component 630 may be configured as or otherwise support a means for obtaining the first information in response to the first request and the second information in response to the second request, where obtaining the set of multiple statistics for the software agent is based on the first information and the second information.

In some examples, the first information includes a first type of information and the second information includes a second type of information different from the first type of information. In some examples, the first information and the second information include one or more performance metrics.

In some examples, to support outputting the set of multiple requests, the request component 625 may be configured as or otherwise support a means for outputting, to a software agent of the one or more software agents, a first request for first information associated with the operation of the software agent and a second request for the software agent to perform a task. In some examples, to support outputting the set of multiple requests, the statistics component 630 may be configured as or otherwise support a means for obtaining the first information in response to the first request and second information associated with execution of the task by the software agent in response to the second request, where obtaining the set of multiple statistics for the software agent is based on the first information and the second information.

In some examples, the request component 625 may be configured as or otherwise support a means for obtaining a first request for information associated with the operation of a software agent of the one or more software agents. In some examples, the request component 625 may be configured as or otherwise support a means for outputting a second request for the information to the software agent in response to the first request. In some examples, the statistics component 630 may be configured as or otherwise support a means for obtaining the information from the software agent in response to the second request, where outputting the recommendation for the software agent is further based on the information.

In some examples, the analytics component 640 may be configured as or otherwise support a means for generating a set of multiple analytics using the one or more rules and the set of multiple statistics for each software agent, where outputting the recommendation for each software agent is based on the set of multiple analytics.

In some examples, to support outputting the recommendation for each software agent, the request component 625 may be configured as or otherwise support a means for outputting a request to review or modify the operation of the respective software agent.

In some examples, the machine learning component 645 may be configured as or otherwise support a means for performing, at the software platform of the device, a training operation using a machine learning model, where the one or more rules are based on the training operation. In some examples, the one or more rules include conditional expressions. In some examples, the performance of the respective software agent is associated with the software platform, one or more other software platforms, a server associated with the respective software agent, or any combination thereof.

Figure 7:
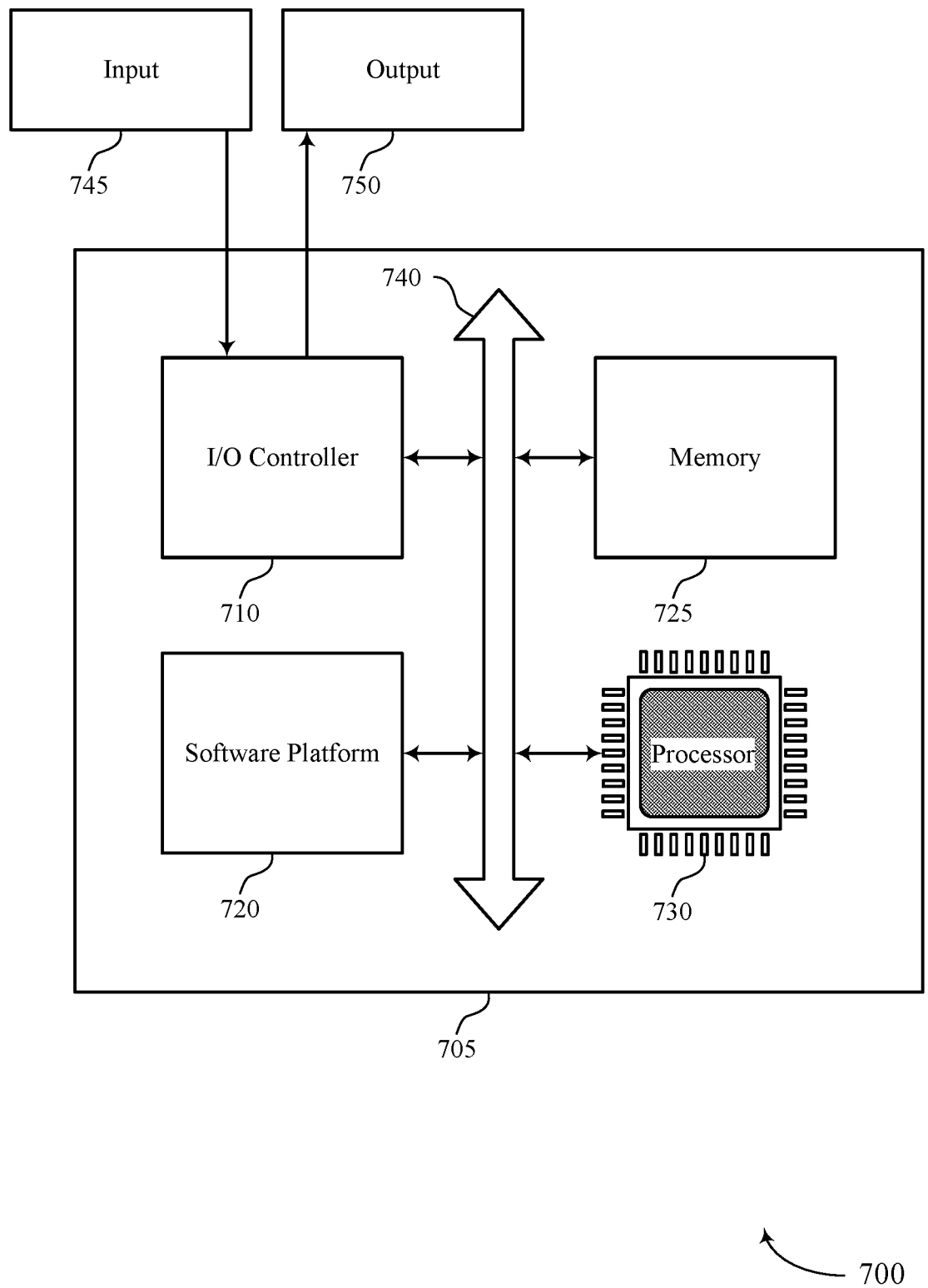
FIG. 7 shows a diagram of a system including a device that supports techniques for managing software agent health in accordance with aspects of the present disclosure.

FIG. 7 shows a diagram of a system 700 including a device 705 that supports techniques for managing software agent health in accordance with aspects of the present disclosure. The device 705 may be an example of or include the components of a device 505 as described herein. The device 705 may include components for bi-directional data communications including components for transmitting and receiving communications, such as a software platform 720, an I/O controller 710, a memory 725, and a processor 730. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for managing software agent health).

The software platform 720 may support managing software agents at a device (e.g., the device 705) in accordance with examples as disclosed herein. For example, the software platform 720 may be configured as or otherwise support a means for outputting, at a software platform of the device, a set of multiple requests to one or more software agents, where each request of the set of multiple requests is associated with operation of a respective software agent. The software platform 720 may be configured as or otherwise support a means for obtaining, at the software platform of the device, a set of multiple statistics for each software agent in response to the set of multiple requests, where the set of multiple statistics corresponds to a performance of the respective software agent. The software platform 720 may be configured as or otherwise support a means for outputting, at the software platform of the device, a recommendation for each software agent based on the set of multiple statistics and one or more rules configured at the software platform of the device.

By including or configuring the software platform 720 in accordance with examples as described herein, the device 705 may support techniques for reduced latency, improved user experience related to reduced processing, and improved utilization of processing capability.

Figure 8:
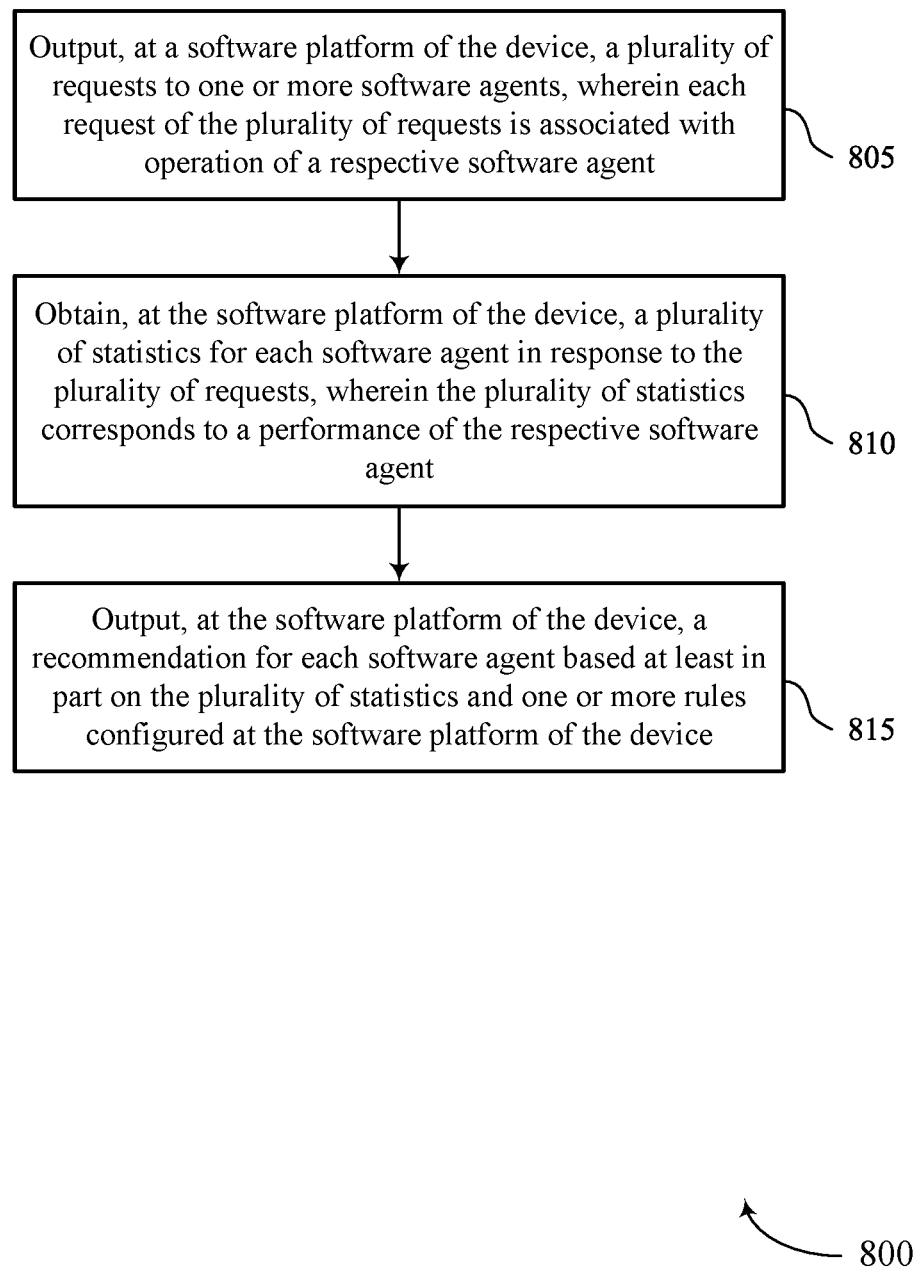
FIGS. 8 and 9 show flowcharts illustrating methods that support techniques for managing software agent health in accordance with aspects of the present disclosure.

FIG. 8 shows a flowchart illustrating a method 800 that supports techniques for managing software agent health in accordance with aspects of the present disclosure. The operations of the method 800 may be implemented by a software platform or its components as described herein. For example, the operations of the method 800 may be performed by a software platform as described with reference to FIGS. 1 through 7. In some examples, a software platform may execute a set of instructions to control the functional elements of the software platform to perform the described functions. Additionally, or alternatively, the software platform may perform aspects of the described functions using special-purpose hardware.

At 805, the method may include outputting, at a software platform of the device, a set of multiple requests to one or more software agents, where each request of the set of multiple requests is associated with operation of a respective software agent. The operations of 805 may be performed in accordance with examples as disclosed herein. In some examples, aspects of the operations of 805 may be performed by a request component 625 as described with reference to FIG. 6.

At 810, the method may include obtaining, at the software platform of the device, a set of multiple statistics for each software agent in response to the set of multiple requests, where the set of multiple statistics corresponds to a performance of the respective software agent. The operations of 810 may be performed in accordance with examples as disclosed herein. In some examples, aspects of the operations of 810 may be performed by a statistics component 630 as described with reference to FIG. 6.

At 815, the method may include outputting, at the software platform of the device, a recommendation for each software agent based on the set of multiple statistics and one or more rules configured at the software platform of the device. The operations of 815 may be performed in accordance with examples as disclosed herein. In some examples, aspects of the operations of 815 may be performed by a recommendation component 635 as described with reference to FIG. 6.

Figure 9:
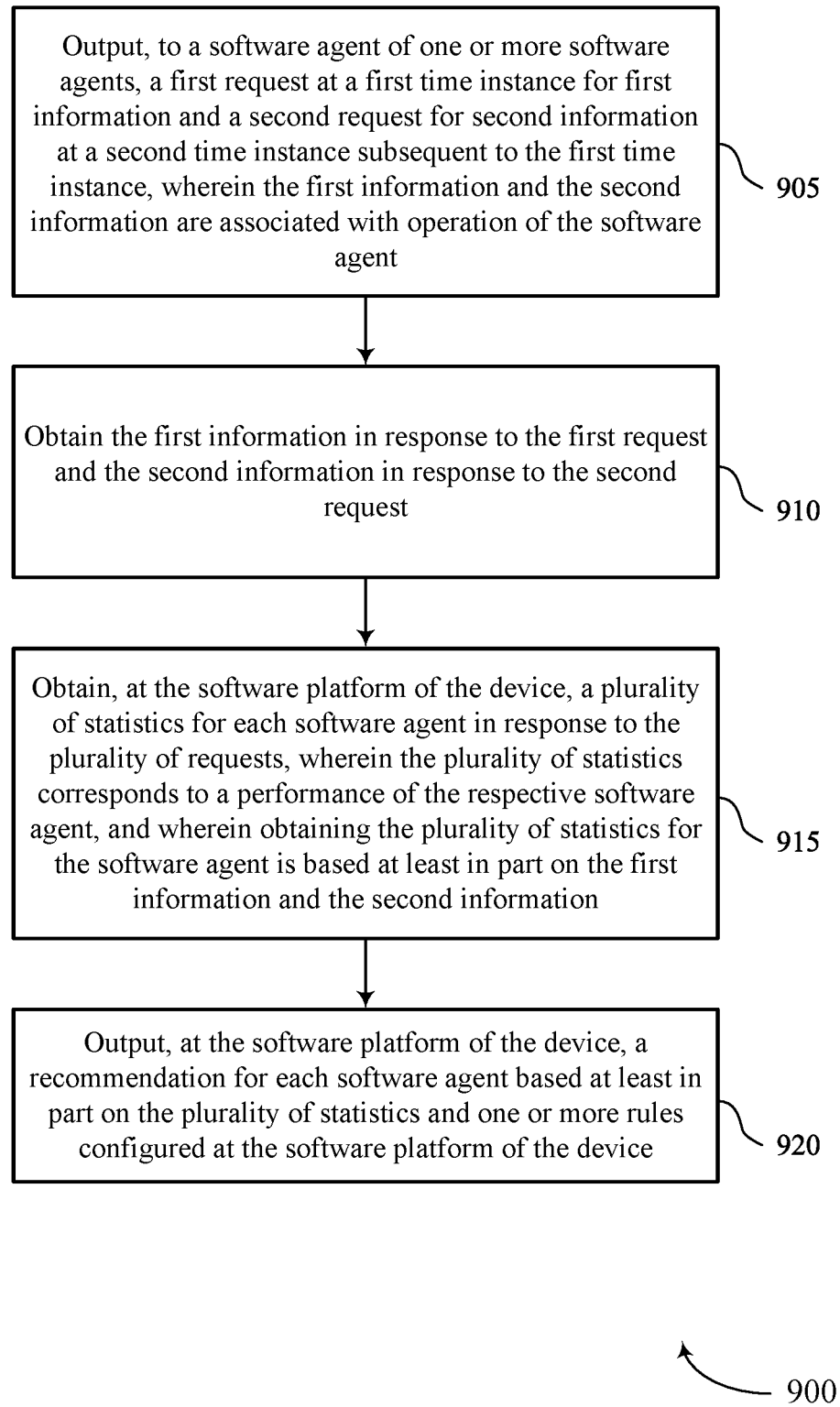

FIG. 9 shows a flowchart illustrating a method 900 that supports techniques for managing software agent health in accordance with aspects of the present disclosure. The operations of the method 900 may be implemented by a software platform or its components as described herein. For example, the operations of the method 900 may be performed by a software platform as described with reference to FIGS. 1 through 7. In some examples, a software platform may execute a set of instructions to control the functional elements of the software platform to perform the described functions. Additionally, or alternatively, the software platform may perform aspects of the described functions using special-purpose hardware.

At 905, the method may include outputting, to a software agent of the one or more software agents, a first request at a first time instance for first information and a second request for second information at a second time instance subsequent to the first time instance, where the first information and the second information are associated with the operation of the software agent. The operations of 905 may be performed in accordance with examples as disclosed herein. In some examples, aspects of the operations of 905 may be performed by a request component 625 as described with reference to FIG. 6.

At 910, the method may include obtaining the first information in response to the first request and the second information in response to the second request. The operations of 910 may be performed in accordance with examples as disclosed herein. In some examples, aspects of the operations of 910 may be performed by a statistics component 630 as described with reference to FIG. 6.

At 915, the method may include obtaining, at the software platform of the device, a set of multiple statistics for each software agent in response to the set of multiple requests, where the set of multiple statistics corresponds to a performance of the respective software agent, and where obtaining the set of multiple statistics for the software agent is based on the first information and the second information. The operations of 915 may be performed in accordance with examples as disclosed herein. In some examples, aspects of the operations of 915 may be performed by a statistics component 630 as described with reference to FIG. 6.

At 920, the method may include outputting, at the software platform of the device, a recommendation for each software agent based on the set of multiple statistics and one or more rules configured at the software platform of the device. The operations of 920 may be performed in accordance with examples as disclosed herein. In some examples, aspects of the operations of 920 may be performed by a recommendation component 635 as described with reference to FIG. 6.

1. A method for managing software agents at a device is described. The method may include outputting, at a software platform of the device, a set of multiple requests to one or more software agents, where each request of the set of multiple requests is associated with operation of a respective software agent, obtaining, at the software platform of the device, a set of multiple statistics for each software agent in response to the set of multiple requests, where the set of multiple statistics corresponds to a performance of the respective software agent, and outputting, at the software platform of the device, a recommendation for each software agent based on the set of multiple statistics and one or more rules configured at the software platform of the device.

2. An apparatus for managing software agents at a device is described. The apparatus may include a processor, memory coupled with the processor, and instructions stored in the memory. The instructions may be executable by the processor to cause the apparatus to output, at a software platform of the device, a set of multiple requests to one or more software agents, where each request of the set of multiple requests is associated with operation of a respective software agent, obtain, at the software platform of the device, a set of multiple statistics for each software agent in response to the set of multiple requests, where the set of multiple statistics corresponds to a performance of the respective software agent, and output, at the software platform of the device, a recommendation for each software agent based on the set of multiple statistics and one or more rules configured at the software platform of the device.

3. Another apparatus for managing software agents at a device is described. The apparatus may include means for outputting, at a software platform of the device, a set of multiple requests to one or more software agents, where each request of the set of multiple requests is associated with operation of a respective software agent, means for obtaining, at the software platform of the device, a set of multiple statistics for each software agent in response to the set of multiple requests, where the set of multiple statistics corresponds to a performance of the respective software agent, and means for outputting, at the software platform of the device, a recommendation for each software agent based on the set of multiple statistics and one or more rules configured at the software platform of the device.

4. A non-transitory computer-readable medium storing code for managing software agents at a device is described. The code may include instructions executable by a processor to output, at a software platform of the device, a set of multiple requests to one or more software agents, where each request of the set of multiple requests is associated with operation of a respective software agent, obtain, at the software platform of the device, a set of multiple statistics for each software agent in response to the set of multiple requests, where the set of multiple statistics corresponds to a performance of the respective software agent, and output, at the software platform of the device, a recommendation for each software agent based on the set of multiple statistics and one or more rules configured at the software platform of the device.

5. In some examples of the method, apparatuses, and non-transitory computer-readable medium described herein, outputting the set of multiple requests may include operations, features, means, or instructions for outputting, to a software agent of the one or more software agents, a first request at a first time instance for first information and a second request for second information at a second time instance subsequent to the first time instance, where the first information and the second information may be associated with the operation of the software agent and obtaining the first information in response to the first request and the second information in response to the second request, where obtaining the set of multiple statistics for the software agent may be based on the first information and the second information.

6. In some examples of the method, apparatuses, and non-transitory computer-readable medium described herein, the first information includes a first type of information and the second information includes a second type of information different from the first type of information.

7. In some examples of the method, apparatuses, and non-transitory computer-readable medium described herein, the first information and the second information include one or more performance metrics.

8. In some examples of the method, apparatuses, and non-transitory computer-readable medium described herein, outputting the set of multiple requests may include operations, features, means, or instructions for outputting, to a software agent of the one or more software agents, a first request for first information associated with the operation of the software agent and a second request for the software agent to perform a task and obtaining the first information in response to the first request and second information associated with execution of the task by the software agent in response to the second request, where obtaining the set of multiple statistics for the software agent may be based on the first information and the second information.

9. Some examples of the method, apparatuses, and non-transitory computer-readable medium described herein may further include operations, features, means, or instructions for obtaining a first request for information associated with the operation of a software agent of the one or more software agents, outputting a second request for the information to the software agent in response to the first request, and obtaining the information from the software agent in response to the second request, where outputting the recommendation for the software agent may be further based on the information.

10. Some examples of the method, apparatuses, and non-transitory computer-readable medium described herein may further include operations, features, means, or instructions for generating a set of multiple analytics using the one or more rules and the set of multiple statistics for each software agent, where outputting the recommendation for each software agent may be based on the set of multiple analytics.

11. In some examples of the method, apparatuses, and non-transitory computer-readable medium described herein, outputting the recommendation for each software agent may include operations, features, means, or instructions for outputting a request to review or modify the operation of the respective software agent.

12. Some examples of the method, apparatuses, and non-transitory computer-readable medium described herein may further include operations, features, means, or instructions for performing, at the software platform of the device, a training operation using a machine learning model, where the one or more rules may be based on the training operation.

13. In some examples of the method, apparatuses, and non-transitory computer-readable medium described herein, the one or more rules include conditional expressions.

14. In some examples of the method, apparatuses, and non-transitory computer-readable medium described herein, the performance of the respective software agent may be associated with the software platform, one or more other software platforms, a server associated with the respective software agent, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing software agents by a software platform at a device, comprising:
    outputting, to one or more software agents, a plurality of requests, wherein each request of the plurality of requests is associated with operation of a respective software agent;
    obtaining a plurality of statistics for each software agent in response to the plurality of requests, wherein the plurality of statistics corresponds to a performance of the respective software agent;
    outputting, at the software platform, a user interface that displays, for each of the one or more software agents, a representation of the plurality of statistics that correspond to the performance of the respective software agent;

obtaining, based at least in part on receiving at the user interface a selection of a first software agent of the one or more software agents, a first request for information associated with operation of the first software agent;

outputting, to the first software agent and in response to the first request, a second request for the information associated with the operation of the first software agent;

obtaining, from the first software agent and in response to the second request, the information;

generating, based at least in part on the information obtained from the first software agent and on a plurality of rules configured at a rule engine, a recommendation for the first software agent, wherein the recommendation is based at least in part on a first plurality of statistics associated with the first software agent and includes a workflow of diagnostic options to perform on the first software agent; and outputting, at the software platform, the recommendation for the first software agent.

2. The method of claim 1, wherein outputting the plurality of requests comprises:

outputting, to a software agent of the one or more software agents, a request for first information at a first time instance and a second request for second information at a second time instance subsequent to the first time instance, wherein the first information and the second information are associated with the operation of the software agent; and obtaining the first information in response to the first request and the second information in response to the second request, wherein obtaining the plurality of statistics is based at least in part on the first information and the second information.

3. The method of claim 2, wherein the first information comprises a first type of information and the second information comprises a second type of information different from the first type of information.

4. The method of claim 2, wherein the first information and the second information comprise one or more performance metrics.

5. The method of claim 1, wherein outputting the plurality of requests comprises:

outputting, to a software agent of the one or more software agents, a request for first information associated with the operation of the software agent and a request for the software agent to perform a task; and obtaining the first information in response to the first request and second information associated with execution of the task by the software agent in response to the second request, wherein obtaining the plurality of statistics is based at least in part on the first information and the second information.

6. The method of claim 1, further comprising:

generating a plurality of analytics using the plurality of rules and the plurality of statistics for each software agent, wherein outputting the recommendation for the first software agent is based at least in part on the plurality of analytics.

7. The method of claim 1, wherein outputting the recommendation for the first software agent comprises:

outputting a request to review or modify the operation of the first software agent.

8. The method of claim 1, further comprising:

performing, at the software platform, a training operation using a machine learning model, wherein the plurality of rules are based at least in part on the training operation.

9. The method of claim 1, wherein the plurality of rules comprise conditional expressions.

10. The method of claim 1, wherein the performance of the respective software agent is associated with the software platform, one or more other software platforms, a server associated with the respective software agent, or any combination thereof.

11. An apparatus for managing software agents by a software platform at a device, comprising:

a processor;

memory coupled with the processor; and instructions stored in the memory and executable by the processor to cause the apparatus to:

output, to one or more software agents, a plurality of requests, wherein each request of the plurality of requests is associated with operation of a respective software agent;

obtain a plurality of statistics for each software agent in response to the plurality of requests, wherein the plurality of statistics corresponds to a performance of the respective software agent;

output, at the software platform, a user interface that displays, for each of the one or more software agents, a representation of the plurality of statistics that correspond to the performance of the respective software agent;

obtain, based at least in part on receipt at the user interface of a selection of a first software agent of the one or more software agents, a first request for information associated with operation of the first software agent;

output, to the first software agent and in response to the first request, a second request for the information associated with the operation of the first software agent;

obtain, from the first software agent and in response to the second request, the information;

generate, based at least in part on the information obtained from the first software agent and on a plurality of rules configured at a rule engine, a recommendation for the first software agent, wherein the recommendation is based at least in part on a first plurality of statistics associated with the first software agent and includes a workflow of diagnostic options to perform on the first software agent; and output, at the software platform, the recommendation for the first software agent.

12. The apparatus of claim 11, wherein the instructions to output the plurality of requests are executable by the processor to cause the apparatus to:

output, to a software agent of the one or more software agents, a request for first information at a first time instance and a request for second information at a second time instance subsequent to the first time instance, wherein the first information and the second information are associated with the operation of the software agent; and obtain the first information in response to the first request and the second information in response to the second request, wherein the plurality of statistics are obtained based at least in part on the first information and the second information.

13. The apparatus of claim 11, wherein the instructions to output the plurality of requests are executable by the processor to cause the apparatus to:

output, to a software agent of the one or more software agents, a request for first information associated with the operation of the software agent and a request for the software agent to perform a task; and obtain the first information in response to the first request and second information associated with execution of the task by the software agent in response to the second request, wherein the plurality of statistics are obtained based at least in part on the first information and the second information.

14. The apparatus of claim 11, wherein the instructions are further executable by the processor to cause the apparatus to:

generate a plurality of analytics using the plurality of rules and the plurality of statistics for each software agent, wherein the recommendation for the first software agent is output based at least in part on the plurality of analytics.

15. A non-transitory computer-readable medium storing code for managing software agents by a software platform at a device, the code comprising instructions executable by a processor to:

output, to one or more software agents, a plurality of requests, wherein each request of the plurality of requests is associated with operation of a respective software agent;

obtain a plurality of statistics for each software agent in response to the plurality of requests, wherein the plurality of statistics corresponds to a performance of the respective software agent;

output, at the software platform, a user interface that displays, for each of the one or more software agents, a representation of the plurality of statistics that correspond to the performance of the respective software agent;

obtain, based at least in part on receipt at the user interface of a selection of a first software agent of the one or more software agents, a first request for information associated with operation of the first software agent;

output, to the first software agent and in response to the first request, a second request for the information associated with the operation of the first software agent;

obtain, from the first software agent and in response to the second request, the information;

generate, based at least in part on the information obtained from the first software agent and on a plurality of rules configured at a rule engine, a recommendation for the first software agent, wherein the recommendation is based at least in part on a first plurality of statistics associated with the first software agent and includes a workflow of diagnostic options to perform on the first software agent; and output, at the software platform, the recommendation for the first software agent.

16. The non-transitory computer-readable medium of claim 15, wherein the instructions to output the plurality of requests are executable by the processor to:

output, to a software agent of the one or more software agents, a request for first information at a first time instance and a request for second information at a second time instance subsequent to the first time instance, wherein the first information and the second information are associated with the operation of the software agent; and obtain the first information in response to the first request and the second information in response to the second request, wherein the plurality of statistics are obtained based at least in part on the first information and the second information.

17. The non-transitory computer-readable medium of claim 15, wherein the instructions to output the plurality of requests are executable by the processor to:

output, to a software agent of the one or more software agents, a request for first information associated with the operation of the software agent and a request for the software agent to perform a task, and obtain the first information in response to the first request and second information associated with execution of the task by the software agent in response to the second request, wherein the plurality of statistics are obtained based at least in part on the first information and the second information.

\* \* \* \* \*